(12) United States Patent
Mori

(10) Patent No.: US 7,697,221 B2
(45) Date of Patent: Apr. 13, 2010

(54) IMAGING LENS AND IMAGING DEVICE

(75) Inventor: Masao Mori, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/042,180

(22) Filed: Mar. 4, 2008

(65) Prior Publication Data

US 2008/0239517 A1  Oct. 2, 2008

(30) Foreign Application Priority Data

Mar. 27, 2007  (JP) ............... P2007-081884

(51) Int. Cl.
*G02B 9/34* (2006.01)
*G02B 3/02* (2006.01)

(52) U.S. Cl. .................. 359/781; 359/715

(58) Field of Classification Search .......... 359/781, 359/708, 715, 762, 770, 771

See application file for complete search history.

(56) References Cited

U.S. PATENT DOCUMENTS

| | | | |
|---|---|---|---|
| 3,799,655 A | | 3/1974 | Laikin |
| 5,721,639 A | * | 2/1998 | Aoshima et al. ......... 359/509 |
| 7,095,569 B2 | * | 8/2006 | Rege et al. ............. 359/749 |
| 7,405,890 B2 | * | 7/2008 | Nakamura ............... 359/781 |
| 7,551,373 B2 | | 6/2009 | Hirose |
| 2003/0133199 A1 | | 7/2003 | Inoue |
| 2006/0187557 A1 | | 8/2006 | Yamakawa |
| 2006/0227434 A1 | | 10/2006 | Hirose et al. |

FOREIGN PATENT DOCUMENTS

| | | |
|---|---|---|
| EP | 0 024 326 A1 | 3/1981 |
| EP | 1 712 943 A1 | 10/2006 |
| JP | 2002-244031 A | 8/2002 |
| JP | 2005-227426 A | 8/2005 |
| JP | 2006-292988 A | 10/2006 |

* cited by examiner

*Primary Examiner*—Jack Dinh
(74) *Attorney, Agent, or Firm*—Birch, Stewart, Kolasch & Birch, LLP

(57) ABSTRACT

An imaging lens includes, in order from an object side, a first lens G1, a second lens G2, a third lens G3, an aperture stop St and a fourth lens G4. The first lens is a negative lens having a meniscus shape with a convex surface directed to the object side. The second lens is a negative lens. The third lens is a positive lens having a convex surface directed to the object side. The fourth lens is a biconvex lens. The following conditional expression is satisfied:

$$1.5 < f4/fa < 2.7 \qquad (1)$$

where fa denotes a focal length of the whole lens system, and f4 denotes a focal length of the fourth lens.

19 Claims, 19 Drawing Sheets

EXAMPLE 1

EXAMPLE 2

EXAMPLE 3

EXAMPLE 4

EXAMPLE 5

EXAMPLE 6

EXAMPLE 7

FIG. 8A

| EXAMPLE 1 BASIC LENS DATA ||||||
|---|---|---|---|---|
| Si (SURFACE NUMBER) | ri (CURVATURE RADIUS) | di (SURFACE SEPARATION) | Ndi (REFRACTIVE INDEX) | υdj (ABBE NUMBER) |
| 1 | 14.533 | 1.309 | 1.75500 | 52.3 |
| 2 | 3.434 | 1.204 | | |
| *3 | -0.813 | 0.670 | 1.53112 | 55.4 |
| *4 | -2.062 | 1.226 | | |
| 5 | 4.179 | 1.639 | 1.92285 | 18.9 |
| 6 | 12.147 | 0.100 | | |
| 7 (APERTURE STOP) | - | 0.610 | | |
| *8 | 4.050 | 1.901 | 1.53112 | 55.4 |
| *9 | -1.225 | 1.109 | | |
| 10 | ∞ | 0.700 | 1.51680 | 64.2 |
| 11 | ∞ | | | |

(*: ASPHERIC SURFACE)

FIG. 8B

| EXAMPLE 1 ASPHERIC-SURFACE DATA |||||
|---|---|---|---|---|
| ASPHERIC COEFFICIENT | SURFACE NUMBER ||||
| | S3 | S4 | S8 | S9 |
| K | 0.000000E + 00 | 0.000000E + 00 | 0.000000E + 00 | 0.000000E + 00 |
| B2 | 0.000000E + 00 | 0.000000E + 00 | 0.000000E + 00 | 0.000000E + 00 |
| B3 | 7.373539E - 01 | 4.667567E - 01 | 4.897951E - 02 | -4.081790E - 02 |
| B4 | -3.763262E - 01 | -9.205163E - 02 | -2.430011E - 01 | 6.561450E - 02 |
| B5 | 7.457510E - 02 | -5.178789E - 02 | 2.911316E - 01 | 3.552838E - 02 |
| B6 | 2.512932E - 02 | 1.705588E - 02 | 8.844616E - 03 | -4.556356E - 02 |
| B7 | -1.994401E - 02 | -6.916733E - 03 | -1.623802E - 01 | -7.469248E - 03 |
| B8 | 4.949607E - 03 | 4.183508E - 03 | -3.574605E - 02 | 1.404735E - 02 |
| B9 | -4.170843E - 04 | 2.181374E - 03 | 1.379829E - 01 | 7.853257E - 03 |
| B10 | -4.638006E - 06 | -7.911373E - 04 | -4.977026E - 02 | -4.519841E - 03 |

FIG. 9A

| EXAMPLE 2 BASIC LENS DATA ||||| 
|---|---|---|---|---|
| Si (SURFACE NUMBER) | ri (CURVATURE RADIUS) | di (SURFACE SEPARATION) | Ndi (REFRACTIVE INDEX) | υdj (ABBE NUMBER) |
| 1 | 11.567 | 1.178 | 1.75500 | 52.3 |
| 2 | 3.248 | 1.224 | | |
| *3 | -1.169 | 0.670 | 1.53112 | 55.4 |
| *4 | -5.407 | 1.092 | | |
| 5 | 4.921 | 1.927 | 1.92285 | 18.9 |
| 6 | 12.145 | 0.100 | | |
| 7 (APERTURE STOP) | - | 0.460 | | |
| *8 | 6.834 | 1.874 | 1.53112 | 55.4 |
| *9 | -1.103 | 1.380 | | |
| 10 | ∞ | 0.700 | 1.51680 | 64.2 |
| 11 | ∞ | | | |

(*: ASPHERIC SURFACE)

FIG. 9B

| EXAMPLE 2 ASPHERIC-SURFACE DATA ||||| 
|---|---|---|---|---|
| ASPHERIC COEFFICIENT | SURFACE NUMBER ||||
| | S3 | S4 | S8 | S9 |
| K | 0.000000E+00 | 0.000000E+00 | 0.000000E+00 | 0.000000E+00 |
| B2 | 0.000000E+00 | 0.000000E+00 | 0.000000E+00 | 0.000000E+00 |
| B3 | 5.022103E-01 | 4.244358E-01 | 9.191802E-02 | 1.864397E-02 |
| B4 | -2.273216E-01 | -2.319127E-01 | -2.806590E-01 | -6.506257E-02 |
| B5 | 2.849389E-02 | 1.072494E-01 | 3.160080E-01 | 1.215616E-01 |
| B6 | 2.761220E-02 | -2.475134E-02 | -1.244736E-02 | -4.643676E-02 |
| B7 | -1.813399E-02 | -2.788045E-02 | -1.918313E-01 | -2.741809E-02 |
| B8 | 4.920592E-03 | 1.023224E-02 | -2.117739E-02 | 1.087206E-02 |
| B9 | -5.545468E-04 | 8.875063E-03 | 1.952094E-01 | 1.206445E-02 |
| B10 | 1.176710E-05 | -3.361066E-03 | -8.668038E-02 | -4.111068E-03 |

FIG. 10A

| EXAMPLE 3 BASIC LENS DATA | | | | |
|---|---|---|---|---|
| Si (SURFACE NUMBER) | ri (CURVATURE RADIUS) | di (SURFACE SEPARATION) | Ndi (REFRACTIVE INDEX) | νdj (ABBE NUMBER) |
| 1 | 13.042 | 0.700 | 1.75500 | 52.3 |
| 2 | 3.032 | 0.878 | | |
| *3 | -3.661 | 0.600 | 1.53112 | 55.4 |
| *4 | -1.892 | 1.047 | | |
| 5 | 3.030 | 1.420 | 1.92285 | 18.9 |
| 6 | 21.258 | 0.453 | | |
| 7 (APERTURE STOP) | - | 0.634 | | |
| *8 | 5.438 | 2.069 | 1.53112 | 55.4 |
| *9 | -1.089 | 1.016 | | |
| 10 | ∞ | 0.700 | 1.51680 | 64.2 |
| 11 | ∞ | | | |

(*: ASPHERIC SURFACE)

FIG. 10B

| EXAMPLE 3 ASPHERIC-SURFACE DATA | | | | |
|---|---|---|---|---|
| ASPHERIC COEFFICIENT | SURFACE NUMBER | | | |
| | S3 | S4 | S8 | S9 |
| K | 0.000000E + 00 | 0.000000E + 00 | 0.000000E + 00 | 0.000000E + 00 |
| B2 | 0.000000E + 00 | 0.000000E + 00 | 0.000000E + 00 | 0.000000E + 00 |
| B3 | -6.132330E - 02 | -5.850763E - 01 | 3.357621E - 02 | 2.326913E - 02 |
| B4 | 5.718340E - 01 | 2.018634E + 00 | -2.347574E - 01 | 4.762562E - 02 |
| B5 | -6.187875E - 01 | -2.671804E + 00 | 2.790328E - 01 | -1.174995E - 01 |
| B6 | 3.034088E - 01 | 1.938627E + 00 | -6.895051E - 02 | 1.597344E - 01 |
| B7 | -4.033211E - 02 | -6.756656E - 01 | -1.155123E - 01 | -9.573878E - 02 |
| B8 | -2.479296E - 02 | 8.090417E - 01 | 7.566459E - 02 | -2.209206E - 02 |
| B9 | 1.096936E - 02 | -1.505984E - 02 | 6.085811E - 03 | 5.128954E - 02 |
| B10 | -1.333514E - 03 | 8.097669E - 03 | -1.332374E - 02 | -1.610027E - 02 |

FIG. 11A

| EXAMPLE 4  BASIC LENS DATA |||||
|---|---|---|---|---|
| Si (SURFACE NUMBER) | ri (CURVATURE RADIUS) | di (SURFACE SEPARATION) | Ndi (REFRACTIVE INDEX) | $\nu dj$ (ABBE NUMBER) |
| 1 | 10.811 | 0.700 | 1.83400 | 37.2 |
| 2 | 3.090 | 1.607 | | |
| *3 | -3.890 | 0.600 | 1.53112 | 55.4 |
| *4 | 1.680 | 0.500 | | |
| 5 | 3.030 | 1.025 | 1.92285 | 18.9 |
| 6 | 7.558 | 0.969 | | |
| 7 (APERTURE STOP) | - | 0.641 | | |
| *8 | 69.355 | 1.776 | 1.53112 | 55.4 |
| *9 | -0.962 | 1.481 | | |
| 10 | ∞ | 0.700 | 1.51680 | 64.2 |
| 11 | ∞ | | | |

(*: ASPHERIC SURFACE)

FIG. 11B

| EXAMPLE 4  ASPHERIC-SURFACE DATA ||||| 
|---|---|---|---|---|
| ASPHERIC COEFFICIENT | SURFACE NUMBER ||||
| | S3 | S4 | S8 | S9 |
| K | 0.000000E + 00 | 0.000000E + 00 | 0.000000E + 00 | 0.000000E + 00 |
| B2 | 0.000000E + 00 | 0.000000E + 00 | 0.000000E + 00 | 0.000000E + 00 |
| B3 | -8.149568E - 02 | -6.617838E - 01 | 1.395578E - 01 | 8.779713E - 02 |
| B4 | 5.085679E - 01 | 1.976749E + 00 | -2.502815E - 01 | -1.062738E - 03 |
| B5 | -6.015311E - 01 | -2.756997E + 00 | 2.889657E - 01 | -1.216234E - 01 |
| B6 | 3.082740E - 01 | 1.940007E + 00 | -8.747501E - 02 | 1.756094E - 01 |
| B7 | -4.057907E - 02 | -6.546553E - 01 | -1.158658E - 01 | -8.777484E - 02 |
| B8 | -2.522952E - 02 | 9.300606E - 02 | 8.853697E - 02 | -1.863864E - 02 |
| B9 | 1.082517E - 02 | -1.339683E - 02 | 1.955243E - 02 | 5.158108E - 02 |
| B10 | -1.281008E - 03 | 4.135057E - 03 | -2.630228E - 02 | -1.877661E - 02 |

FIG. 12A

| EXAMPLE 5 BASIC LENS DATA ||||||
|---|---|---|---|---|
| Si (SURFACE NUMBER) | ri (CURVATURE RADIUS) | di (SURFACE SEPARATION) | Ndi (REFRACTIVE INDEX) | $\nu dj$ (ABBE NUMBER) |
| 1 | 30.668 | 1.665 | 1.69350 | 53.2 |
| 2 | 2.331 | 0.622 | | |
| *3 | -6.635 | 1.152 | 1.50959 | 56.2 |
| *4 | 1.625 | 0.426 | | |
| 5 | 2.114 | 1.402 | 1.92285 | 18.9 |
| 6 | -91.600 | 0.150 | | |
| 7 (APERTURE STOP) | - | 0.379 | | |
| *8 | 29.002 | 2.132 | 1.57782 | 59.0 |
| *9 | -1.063 | 0.841 | | |
| 10 | ∞ | 0.700 | 1.51680 | 64.2 |
| 11 | ∞ | | | |

(*: ASPHERIC SURFACE)

FIG. 12B

| EXAMPLE 5 ASPHERIC-SURFACE DATA ||||| 
|---|---|---|---|---|
| ASPHERIC COEFFICIENT | SURFACE NUMBER ||||
| | S3 | S4 | S8 | S9 |
| K  | 1.157168E + 00 | -1.980097E + 00 | -1.672612E + 00 | -9.321733E - 01 |
| B2 | 0.000000E + 00 | 0.000000E + 00  | 0.000000E + 00  | 0.000000E + 00 |
| B3 | 2.153661E - 01 | 3.395556E - 01  | 1.535563E - 01  | -1.429788E - 01 |
| B4 | -4.410893E - 02 | -1.624761E - 01 | -1.223001E + 00 | 1.912150E - 01 |
| B5 | -4.483535E - 02 | -9.986674E - 02 | 4.832756E + 00  | -7.313690E - 02 |
| B6 | 2.259118E - 02 | 2.592952E - 01  | -7.981807E + 00 | -1.853942E - 01 |
| B7 | 6.517846E - 03 | -1.004885E - 01 | -1.522082E + 00 | 1.196116E - 01 |
| B8 | -3.342036E - 03 | -9.470679E - 02 | 2.289024E + 01  | 1.896158E - 01 |
| B9 | -1.290431E - 03 | 9.765748E - 02  | -2.836237E + 01 | -2.203864E - 01 |
| B10 | 5.354109E - 04 | -2.542626E - 02 | 1.137639E + 01 | 6.329868E - 02 |

FIG. 13A

| EXAMPLE 6 BASIC LENS DATA |||||
|---|---|---|---|---|
| Si (SURFACE NUMBER) | ri (CURVATURE RADIUS) | di (SURFACE SEPARATION) | Ndi (REFRACTIVE INDEX) | $\nu dj$ (ABBE NUMBER) |
| 1 | 12.744 | 0.700 | 1.51633 | 64.1 |
| 2 | 3.031 | 1.430 | | |
| *3 | -2.397 | 0.500 | 1.53156 | 55.4 |
| *4 | 1.961 | 0.843 | | |
| 5 | 3.030 | 1.858 | 1.73999 | 28.3 |
| 6 | -13.589 | 0.200 | | |
| 7 (APERTURE STOP) | - | 0.790 | | |
| *8 | 8.585 | 1.930 | 1.53156 | 55.4 |
| *9 | -1.046 | 1.012 | | |
| 10 | ∞ | 0.700 | 1.51680 | 64.2 |
| 11 | ∞ | | | |

(*: ASPHERIC SURFACE)

FIG. 13B

| EXAMPLE 6 ASPHERIC-SURFACE DATA ||||| 
|---|---|---|---|---|
| ASPHERIC COEFFICIENT | SURFACE NUMBER ||||
| | S3 | S4 | S8 | S9 |
| K | 0.000000E + 00 | 0.000000E + 00 | 0.000000E + 00 | 0.000000E + 00 |
| B2 | 0.000000E + 00 | 0.000000E + 00 | 0.000000E + 00 | 0.000000E + 00 |
| B3 | -1.166258E - 01 | -6.821072E - 01 | 3.330504E - 01 | 2.630491E - 01 |
| B4 | 6.139833E - 01 | 2.058443E + 00 | -7.966302E - 01 | -2.777375E - 01 |
| B5 | -6.161534E - 01 | -2.794130E + 00 | 7.118380E - 01 | 1.140427E - 01 |
| B6 | 2.983728E - 01 | 2.065688E + 00 | -1.095057E - 01 | 1.277534E - 01 |
| B7 | -4.285543E - 02 | -6.152455E - 01 | -2.254395E - 01 | -1.420677E - 01 |
| B8 | -2.439846E - 02 | 4.647960E - 02 | 8.307616E - 02 | -1.557490E - 02 |
| B9 | 1.167406E - 02 | -5.821957E - 02 | 5.654578E - 02 | 6.287212E - 02 |
| B10 | -1.506810E - 03 | 2.697439E - 02 | -3.138098E - 02 | -1.905668E - 02 |

FIG. 14A

| EXAMPLE 7 BASIC LENS DATA | | | | |
|---|---|---|---|---|
| Si (SURFACE NUMBER) | ri (CURVATURE RADIUS) | di (SURFACE SEPARATION) | Ndi (REFRACTIVE INDEX) | $\nu dj$ (ABBE NUMBER) |
| 1 | 17.099 | 0.700 | 1.58913 | 61.2 |
| 2 | 3.095 | 1.516 | | |
| *3 | -2.616 | 0.525 | 1.53156 | 55.4 |
| *4 | 1.781 | 0.996 | | |
| 5 | 3.030 | 1.291 | 2.14352 | 17.8 |
| 6 | 8.463 | 0.574 | | |
| 7 (APERTURE STOP) | - | 0.653 | | |
| *8 | 6.122 | 2.360 | 1.50959 | 56.2 |
| *9 | -0.977 | 1.065 | | |
| 10 | ∞ | 0.700 | 1.51680 | 64.2 |
| 11 | ∞ | | | |

(*: ASPHERIC SURFACE)

FIG. 14B

| EXAMPLE 7 ASPHERIC SURFACE DATA | | | | |
|---|---|---|---|---|
| ASPHERIC COEFFICIENT | SURFACE NUMBER | | | |
| | S3 | S4 | S8 | S9 |
| K | 0.000000E + 00 | 0.000000E + 00 | 0.000000E + 00 | 0.000000E + 00 |
| B2 | 0.000000E + 00 | 0.000000E + 00 | 0.000000E + 00 | 0.000000E + 00 |
| B3 | -1.1051445E - 01 | -9.126089E - 01 | 1.886146E - 01 | 1.158330E - 01 |
| B4 | 5.638047E - 01 | 2.397883E + 00 | -4.009956E - 01 | -5.091456E - 03 |
| B5 | -6.100201E - 01 | -2.931092E + 00 | 3.577377E - 01 | -7.429549E - 02 |
| B6 | 3.038750E - 01 | 1.930442E + 00 | -7.319244E - 02 | 1.486324E - 01 |
| B7 | -4.104654E - 02 | -6.338335E - 01 | -1.330561E - 01 | -1.039824E - 01 |
| B8 | -2.493361E - 02 | 1.006526E - 01 | 9.163912E - 02 | -1.988055E - 02 |
| B9 | 1.114385E - 02 | -1.465130E - 02 | 2.519758E - 02 | 5.345095E - 02 |
| B10 | -1.359979E - 03 | 2.245045E - 03 | -3.200575E - 02 | -1.628358E - 02 |

FIG. 15

VALUES REGARDING CONDITIONAL EXPRESSIONS

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| f1 | -6.274 | -6.370 | -5.394 | -5.411 | -3.728 | -7.894 | -6.536 |
| f4 | 2.023 | 1.948 | 1.917 | 1.801 | 1.823 | 1.885 | 1.862 |
| fa | 0.936 | 0.923 | 0.883 | 0.745 | 1.023 | 0.842 | 0.776 |
| (1) f4 / fa | 2.163 | 2.111 | 2.170 | 2.416 | 1.782 | 2.239 | 2.399 |
| (2) f1 / fa | -6.706 | -6.903 | -6.105 | -7.259 | -3.645 | -9.377 | -8.422 |
| (3) (r3 + r4) / (r3 − r4) | -2.303 | -1.552 | 0.319 | 0.397 | 0.607 | 0.100 | 0.190 |
| (4) d6 / (d7 + d8) | 0.040 | 0.043 | 0.167 | 0.401 | 0.060 | 0.074 | 0.190 |
| (5) υd3 | 18.9 | 18.9 | 18.9 | 18.9 | 18.9 | 28.3 | 17.8 |
| (6) υd1 | 52.3 | 52.3 | 52.3 | 37.2 | 53.2 | 64.1 | 61.2 |

EXAMPLE 1

EXAMPLE 2

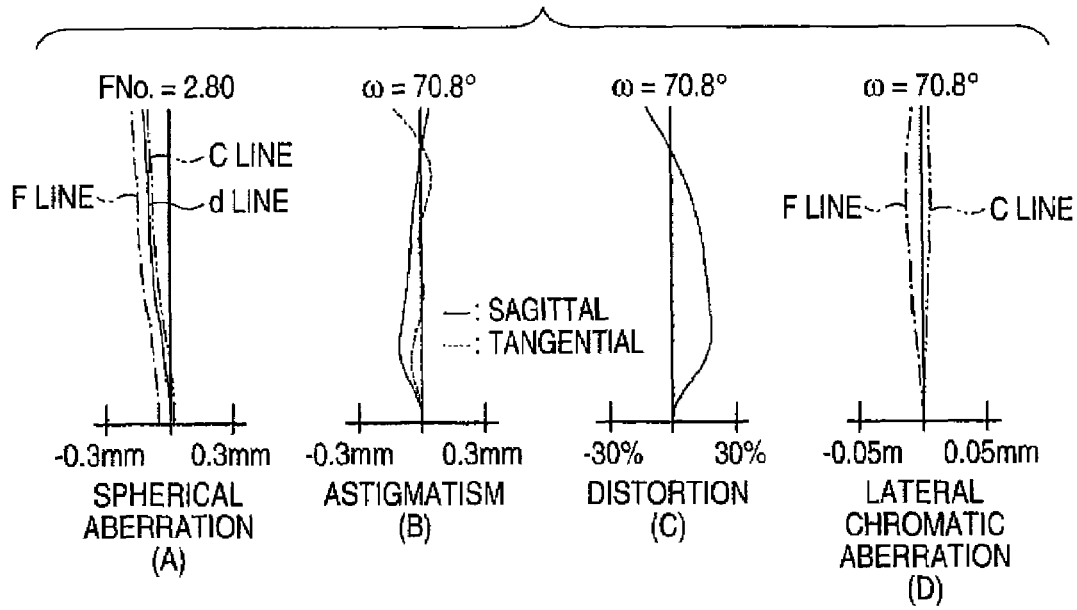
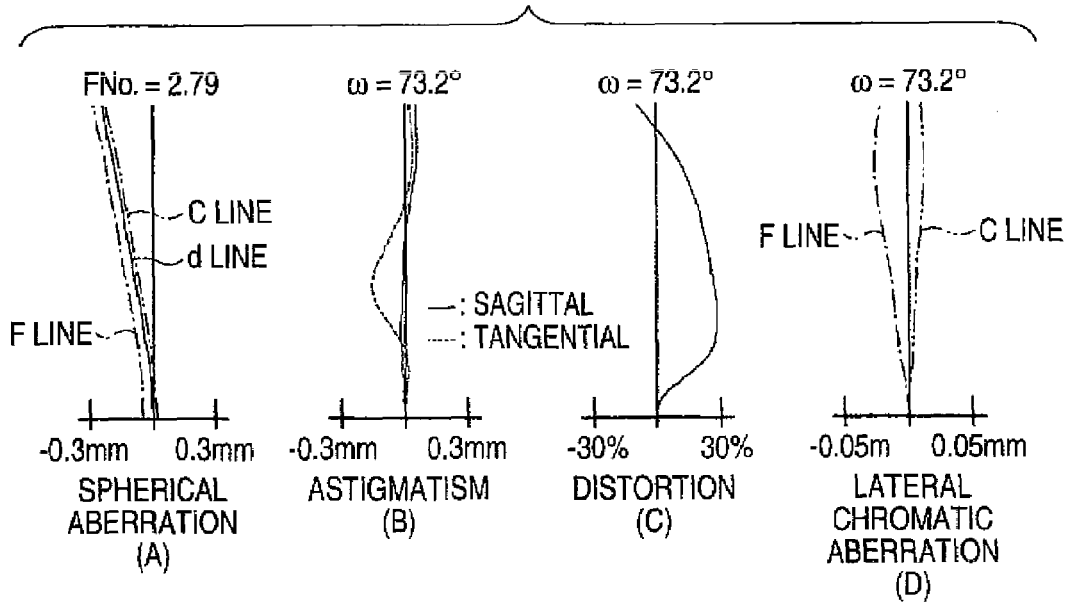

EXAMPLE 5

EXAMPLE 6

EXAMPLE 7

IMAGING LENS AND IMAGING DEVICE

CROSS-REFERENCE TO RELATED APPLICATIONS

This application is based upon and claims the benefit of priority from the Japanese Patent Application No. 2007-81884 filed on Mar. 27, 2007; the entire contents of which are incorporated herein by reference.

BACKGROUND OF THE INVENTION

1. Technical Field

The invention relates to a small wide-angle lens system, and particularly relates to: an imaging lens that is suitable for a variety of digital input devices employing a solid-state imaging element such as a charge coupled device (CCD) or a complementary metal oxide semiconductor (CMOS)—for example, a digital camera, a television phone, and a surveillance camera such as a vehicle-mounting camera and a door phone; and an imaging device that converts an optical image formed by the imaging lens into imaging signals.

2. Description of the Related Art

For example, in surveillance cameras or vehicle-mounting cameras, a wide-angle type imaging lens having a wide viewing angle is used to taking an image with a wide area. JP 2002-244031 A, JP 2005-227426 A and JP 2006-292988 A (corresponding to US 2006/0227434 A) has proposed, as such a wide-angle lens, lenses having a smaller size than that of the conventional eight-lens-group wide-angle lens, by constructing the lens system with 4 lenses in total.

In recent years, the wide-angle lens for use in the digital input devices is required a long back focus, a small size, and a small image distortion. However, the wide-angle lenses described in the above publications are not sufficient in downsizing. The total length of those lenses (distance from a vertex of a first lens to an image formation surface) is large, and the diameter of the first lens increases together with the total length thereof. Also, in order to achieve wide angle, those lens have a lens configuration similar to a fisheye type. Therefore, the distortion thereof is large and a greatly distorted image is formed. Accordingly, there is a demand for development of a lens that has a wide viewing angle, a small size, and a small image distortion.

SUMMARY OF THE INVENTION

The invention has been made in view of the above circumstances and provides an imaging lens with high performance, that have a wide viewing angle, a small size, and small image distortion, and an imaging device.

According to an aspect of the invention, an imaging lens includes, in order from an object side, a first lens, a second lens, a third lens, an aperture stop and a fourth lens. The first lens is a negative lens having a meniscus shape with a convex surface directed to the object side. The second lens is a negative lens. The third lens is a positive lens having a convex surface directed to the object side. The fourth lens is a biconvex lens. The following conditional expression is satisfied:

$$1.5 < f4/fa < 2.7 \quad (1)$$

where fa denotes a focal length of the whole lens system, and f4 denotes a focal length of the fourth lens.

With this configuration, since the shapes and power distribution of the first to fourth lenses are defined appropriately, it is possible to obtain excellent optical performance with a wide angle, a small size, and a less image distortion. Particularly, since the power of the fourth lens has a proper value by satisfying Conditional Expression (1), it is possible to obtain a wide-angle lens system that is corrected well in aberration and that has a small size and a long back focus. Since the third lens is the positive lens having the convex surface directed to the object side and the fourth lens is the biconvex lens, a light flux greatly diverged by the first lens and the second lens are gradually concentrated on the optical axis. Accordingly, it is possible to correct the aberrations well while taking a long back focus on the optical axis. Field curvature and distortion of an abaxial light flux can be corrected while an incidence angle of the abaxial light flux onto the image formation surface can be made to gradually decrease by using the respective surfaces. Thereby, aberration can be corrected well.

Furthermore, it is possible to further improve the optical performance by properly employing the following preferable configurations.

The imaging lens may satisfy the following conditional expression. Thereby, the decrease in size of the lens system and the elongation of the back focus can be efficiently performed while the aberration is corrected well. Thereby, high optical performance can be obtained.

$$-10.0 < f1/fa < -2.5 \quad (2)$$

where fa denotes a focal length of the whole lens system, f1 denotes a focal length of the first lens.

Also, the imaging lens may satisfy the following conditional expression. Thereby, the decrease in size of the lens system and the elongation of the back focus can be efficiently performed while the aberration is corrected well. Thereby, high optical performance can be obtained.

$$-3.0 < (r3+r4)/(r3-r4) < 1.0 \quad (3)$$

where r3 denotes a curvature radius of an object-side surface of the second lens, and r4 denotes a curvature radius of an image-side surface of the second lens.

In the imaging lens, an object-side surface of the second lens may include an aspheric surface that has a concave shape toward the object side in a vicinity of an optical axis and has a convex shape toward the object side in a peripheral portion.

With this configuration, it is easy to obtain high resolution all over the image formation range.

In the imaging lens, the aperture stop may be positioned to satisfy the following conditional expression. With this configuration, an angle of a main beam of a light flux that is incident on the image formation surface at each image height is properly adjusted.

$$d6/(d7+d8) < 0.5 \quad (4)$$

where d6 denotes a distance, on an optical axis, between the third lens and the aperture stop, d7 denotes a distance, on the optical axis, between the aperture stop and the fourth lens, and d8 denotes a center thickness of the fourth lens.

In the imaging lens, an Abbe number vd3 of the third lens at a d-line and an Abbe number vd1 of the first lens at the d-line may satisfy the following conditional expression. With this configuration, it is advantageous in correction of lateral chromatic aberration.

$$vd3 < 30 \quad (5)$$

$$vd1 > 34 \quad (6)$$

Also, the first lens may be made of a glass material, and a surface treatment for giving a water-repellent property may be applied to an object-side surface of the first lens. With this configuration, it is possible to obtain performance suitable for the case where the imaging lens is used in outdoors for a surveillance camera or vehicle-mounting camera and that the object-side surface of the first lens is exposed to the outside. For example, it is possible to improve the impact resistance or friction resistance of the imaging lens.

Also, at least one lens of the second lens, the third lens, and the fourth lens may be made of a resin material. In this case, a surface treatment for giving a property of reflecting or absorbing UV light may be applied to at least one of the lens surfaces that are closer to the object side than the object-side surface of the most-object-side resin lens. With this configuration, it is possible to prevent the resin lens from being deteriorated due to the ultraviolet rays.

According to another aspect of the invention, an imaging device includes the imaging lens having any of the above configurations, and an imaging element that outputs imaging signals corresponding to an optical image formed by the imaging lens.

In the imaging device having the above configuration, it is possible to obtain imaging signals with high resolution on the basis of an optical image with high resolution formed by the imaging lens.

According to the imaging lens set forth above, since the shapes and power distributions of the first to fourth lenses G1 to G4 are appropriately defined, particularly, since the fourth lens is the biconvex lens and its power is set to an appropriate value, it is possible to provide a wide-angle lens system with high performance that has a wide viewing angle, a small size, and small image distortion.

Also, according to the imaging device set forth above, since the imaging signals are output which correspond to the optical image formed by the imaging lens with high performance, it is possible to obtain imaging signals with high resolution.

BRIEF DESCRIPTION OF THE DRAWINGS

FIG. 8 is a diagram illustrating lens data of the imaging lens according to Example 1 of the invention, where FIG. 8A shows basic lens data and FIG. 8B show aspheric lens data.

FIG. 9 is a diagram illustrating lens data of the imaging lens according to Example 2 of the invention, where FIG. 9A shows basic lens data and FIG. 9B show aspheric lens data.

FIG. 10 is a diagram illustrating lens data of the imaging lens according to Example 3 of the invention, where FIG. 10A shows basic lens data and FIG. 10B show aspheric lens data.

FIG. 11 is a diagram illustrating lens data of the imaging lens according to Example 4 of the invention, where FIG. 11A shows basic lens data and FIG. 11B show aspheric lens data.

FIG. 12 is a diagram illustrating lens data of the imaging lens according to Example 5 of the invention, where FIG. 12A shows basic lens data and FIG. 12B show aspheric lens data.

FIG. 13 is a diagram illustrating lens data of the imaging lens according to Example 6 of the invention, where FIG. 13A shows basic lens data and FIG. 13B show aspheric lens data.

FIG. 14 is a diagram illustrating lens data of the imaging lens according to Example 7 of the invention, where FIG. 14A shows basic lens data and FIG. 14B show aspheric lens data.

FIG. 15 is a diagram collectively illustrating values regarding conditional expressions of Examples.

FIG. 16A shows a spherical aberration, FIG. 16B shows astigmatism, FIG. 16C shows distortion, and FIG. 16D shows a lateral chromatic aberration.

FIG. 17A shows a spherical aberration, FIG. 17B shows astigmatism, FIG. 17C shows distortion, and FIG. 17D shows a lateral chromatic aberration.

FIG. 18 is an aberration diagram illustrating various aberrations in the imaging lens according to Example 3 of the invention, where FIG. 18A shows a spherical aberration, FIG. 18B shows astigmatism, FIG. 18C shows distortion, and FIG. 18D shows a lateral chromatic aberration.

FIG. 19 is an aberration diagram illustrating various aberrations in the imaging lens according to Example 4 of the invention, where FIG. 19A shows a spherical aberration, FIG. 19B shows astigmatism, FIG. 19C shows distortion, and FIG. 19D shows a lateral chromatic aberration.

FIG. 20A shows a spherical aberration, FIG. 20B shows astigmatism, FIG. 20C shows distortion, and FIG. 20D shows a lateral chromatic aberration.

FIG. 21A shows a spherical aberration, FIG. 21B shows astigmatism, FIG. 21C shows distortion, and FIG. 21D shows a lateral chromatic aberration.

FIG. 22A shows a spherical aberration, FIG. 22B shows astigmatism, FIG. 22C shows distortion, and FIG. 22D shows a lateral chromatic aberration.

DETAILED DESCRIPTION OF EMBODIMENTS OF THE INVENTION

Hereinafter, embodiments of the invention will be described in detail with reference to the drawings.

Figure 1:
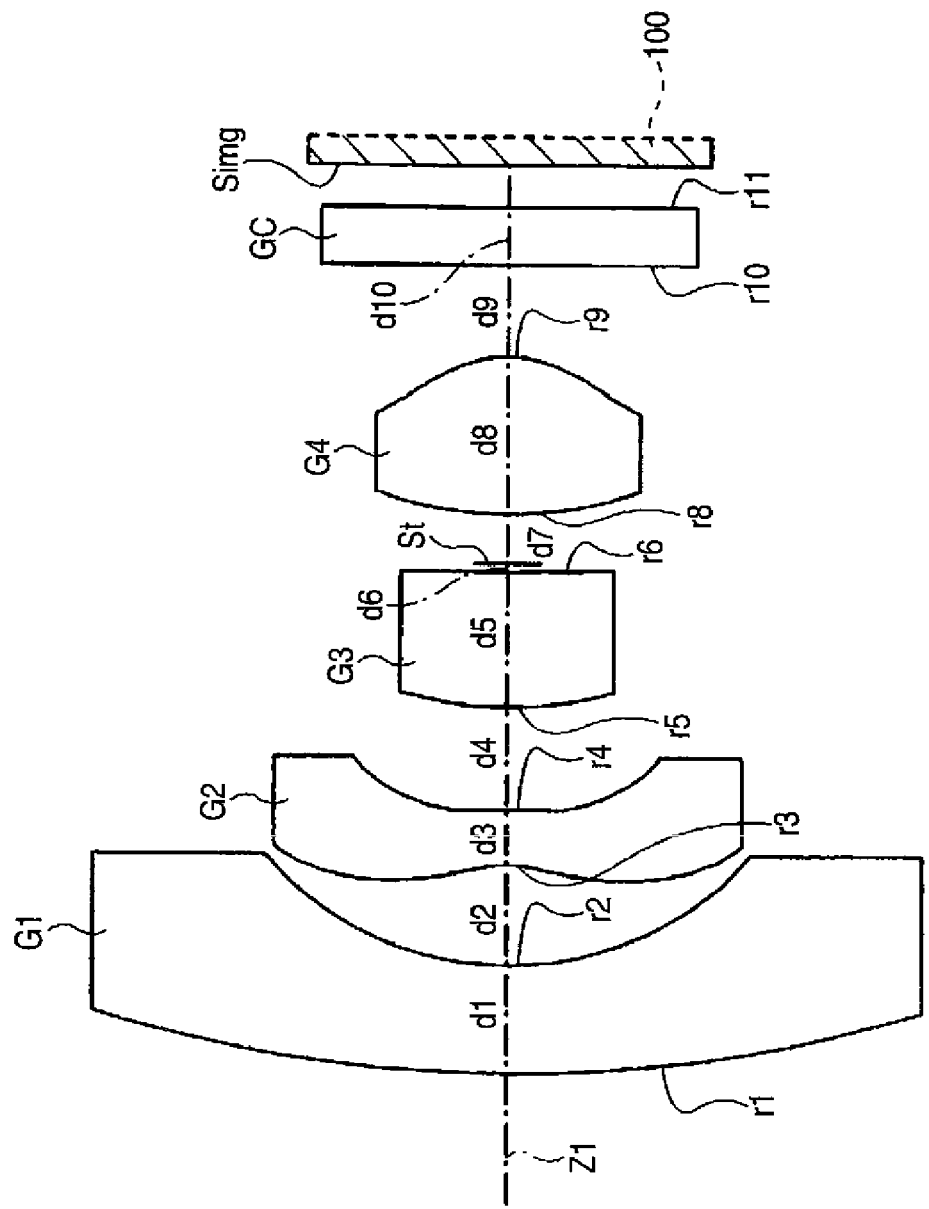
FIG. 1 is a diagram that illustrates a first configuration example of an imaging lens according to an embodiment of the invention and that shows a section view of lenses corresponding to Example 1.

FIG. 1 shows a first configuration example of an imaging lens according to an embodiment of the invention. This configuration example corresponds to a lens configuration of a first numerical example (FIGS. 5A and 8B) which will be described later. FIGS. 2 to 7 show second to seventh configuration examples and correspond to lens configurations of second to seventh numerical examples (FIGS. 9A and 9B to FIGS. 14A and 14B) which will be described later. In FIGS. 1 to 7, reference numeral ri denotes a curvature radius of an i-th surface when a surface of the most-object-side element is counted as the first surface and the surface number increases in order toward the image surface (the image forming side). Reference numeral di denotes a surface separation between an i-th surface and an (i+1)-th surface on an optical axis Z1. The respective configuration examples basically have the same configuration.

The imaging lens is suitably used for various digital input devices, particularly for a digital camera, a television phone or a surveillance camera such as a vehicle-mounting camera and a door phone. In addition, the imaging lens may be used for an imaging system using near infrared rays of 750 nm to 1000 nm in wavelength, such as night vision camera, a fingerprint recognition camera, and a vein recognition camera.

The imaging lens includes, in order from an object side along the optical axis Z1, a first lens G1, a second lens G2, a third lens G3, an optical aperture stop St and a fourth lens G4.

An imaging element 100 such as a CCD is disposed on an image formation surface Simg of the imaging lens. The imaging device according to the embodiment of the invention includes at least the imaging lens and the imaging element 100. Various kinds of optical members GC may be disposed between the fourth lens G4 and the imaging element 100, in accordance with the configuration of a camera on which the lens is mounted. Flat-panel-shaped optical members such as a cover glass for protecting an imaging surface or an UV cut filter may be disposed therebetween.

The first lens G1 is a negative lens having a meniscus shape with a convex surface directed to the object side. The third lens G3 is a positive lens having a convex surface directed to the object side. In the configuration example shown in FIG. 6, the third lens G3 is a biconvex positive lens. In the other examples, the third lens G3 is a positive lens having the meniscus shape.

The second lens 62 is a negative lens. In the configuration examples shown in FIGS. 1 and 2, the second lens G2 is a negative lens having a meniscus shape. In the configuration examples shown in FIGS. 3 to 7, the second lens G2 is a biconcave negative lens. To correct aberrations, it is preferable that the second lens G2 is an aspheric lens. Particularly, it is preferable that its object-side surface is an aspheric surface that has a concave shape toward the object side in the vicinity of the optical axis and has a convex shape toward the object side in the peripheral portion thereof.

The fourth lens G4 is a biconvex positive lens. To correct aberrations, it is preferable that the fourth lens G4 is an aspheric lens. The fourth lens G4 satisfies the following conditional expression. Here, fa denotes a focal length of the whole lens system and f4 denotes a focal length of the fourth lens.

$$1.5 < f4/fa < 2.7 \quad (1)$$

It is preferable that the imaging lens satisfies the following conditional expressions. Here, f1 denotes the focal length of the first lens G1, r3 denotes a curvature radius of the object-side surface of the second lens G2, and r4 denotes a curvature radius of the image-side surface of the second lens G2.

$$-10.0 < f1/fa < -2.5 \quad (2)$$

$$-3.0 < (r3+r4)/(r3-r4) < 1.0 \quad (3)$$

Also, it is preferable that the aperture stop St is positioned to satisfy the following conditional expression. Here, d6 denotes a distance on the optical axis between the third lens G3 and the aperture stop St, d7 denotes a distance on the optical axis between the aperture stop St and the fourth lens G4, and d8 denotes a center thickness of the fourth lens G4.

$$d6/(d7+d8) < 0.5 \quad (4)$$

The aperture stop St may be in close contact with the image-side surface of the third lens G3 (d6=0). For example, the aperture stop may be formed by directly coating the image-side surface of the third lens G3 with a coating material or the like. A virtual aperture stop may be disposed in the third lens G3 (d6<0). However, in this case, it is necessary to separately provide means for regulating the brightness of the lens system on a front side of the object-side surface of the third lens G3 and on a rear side of the image-side surface thereof. In this case, since shading occurs in the peripheral light flux, it is not preferable.

It is preferable that an Abbe number vd3 of the third lens 63 at a d-line and an Abbe number vd1 of the first lens G1 at the d-line satisfy the following conditional expressions.

$$vd3 < 30 \quad (5)$$

$$vd1 > 34 \quad (6)$$

In the imaging lens, the first lens G1 is preferably a glass lens or a ceramic lens. When the object-side surface of the first lens G1 is exposed to the outside for use, the first lens may be made of a material that is unlikely to be scratched by impact or friction. It is preferable that the first lens is made of a material whose transmittance is not deteriorated due to the UV light. Accordingly, the fist lens G1 may be made of a glass material. The glass material is desirable because it is excellent in coating selectivity and high in adhesion strength. The object-side surface of the first lens G1 may be subjected to the surface treatment for giving a water-repellent property. Particularly, when it is used in outdoor for a surveillance camera or a vehicle-mounting camera, the coating treatment for giving the water-repellent property is very effective.

In the imaging lens, it is preferable that at least one lens of three lenses of the second lens 62, the third lens G3, and the fourth lens G4 is made of a resin material. Particularly, when the second lens G2 and the fourth lens G4 are aspheric, it is preferable that those lenses are made of the resin lens in terms of workability. Since the resin material allows the shape of the lens surface to be freer than the glass material, it enhances the degree of freedom in design regarding the correction of the distortion and/or the control of the ray angle. When the resin lens is employed, a surface treatment giving a property of reflecting or absorbing an ultraviolet ray may be applied to any one of object-side surfaces that is closer to the object side than the object-side surface of the most-object-side resin lens. Resin lenses are deteriorated in transmittance due to application of the UV light for a long time. Accordingly, when a resin lens is employed in an optical system used in outdoor or using the UV light, a coating process of giving the property for reflecting or absorbing the UV light may be applied to the object-side surface (for example, the object-side or image-side surface of the first lens G1) which is closer to the object side than the most-object-side resin lens.

It is preferable, from the viewpoint of decrease in the number of parts and decrease in cost, that a surface treatment for giving a water-repellent function or the function of reflecting or absorbing the UV is applied to a lens surface. However, a filter or the like having the same function may be newly provided. For example, the filter may be disposed in just front of the first lens G1.

Next, operations and advantages of the imaging lens having the above-mentioned configuration will be described.

In the imaging lens, since the shapes and power distribution of the first lens G1 to the fourth lens G4 are defined appropriately, it is possible to obtain excellent optical performance, which has a wide viewing angle, a small size and small image distortion, with a relatively small lens configuration of four lenses in total. Particularly, since Conditional Expression (1) is satisfied and thus the power of the fourth lens G4 is defined appropriately, it is possible to obtain a wide-angle lens system which is corrected well in aberration and which has a small size and a long back focus. Also, in the imaging lens, the third lens G3 is the positive lens having the convex surface directed to the object side and the fourth lens 64 is the biconvex positive lens. With this combination of the lens shapes, the light flux diverged by the first lens G1 and the second lens G2 can be gradually concentrated on the optical axis. Accordingly, it is possible to correct the aberrations well while taking the long back focus on the optical axis. A field curvature and distortion of an abaxial light flux can be corrected and the incidence angle of the abaxial light flux on the image formation surface can be made to gradually decrease by the use of the respective surfaces. Thereby, aberrations can be corrected well.

In the imaging lens, the second lens G2 may be formed in such a shape to give a strong divergence property to the light flux in the vicinity of the center and to relax the divergence property or to give a light concentrating property to the peripheral portion. Therefore, the object-side surface of the second lens G2 may include an aspheric surface which has a concave shape toward the object side in the vicinity of the optical axis and a convex shape toward the object side in the peripheral portion. Accordingly, since the light flux in the vicinity of the peripheral portion which is excessively curved by the first lens G1, particularly, its meridional image surface, can be corrected well, it is possible to obtain high resolution all over the entire image forming range.

Conditional Expression (1) defines proper power to be given to the fourth lens G4. When f4/fa falls below the lower limit of Conditional Expression (1) and the power of the fourth lens G4 becomes too strong, it is difficult to ensure a long back focus. When f4/fa exceeds the upper limit and the power of the fourth lens G4 becomes too weak, the light flux diverged by the negative lenses of the first lens G1 and the second lens G2 is concentrated slowly, thereby making it difficult to decrease the size of the lens.

When Conditional Expressions (2) and (3) are satisfied together with Conditional Expression (1), it is possible to efficiently accomplish the decrease in size of the lens system and the elongation of the back focus while aberration is corrected well. Thereby, higher optical performance can be obtained. In order to obtain a long back focus, it is effective that the light flux is made to diverge once by the negative lens and then is gradually concentrated by the positive lens. Since the first lens G1 and the second lens G2 as the negative lens are configured to satisfy Conditional Expressions (2) and (3), the distance from the object-side surface of the first lens G1 to the image formation surface can be reduced to accomplish the decrease in size while it makes possible to correct the distortion and the field curvature with good balance.

When f1/fa falls below the lower limit of Conditional Expression (2), the negative power of the first lens G1 is decreased and thus the divergence of the light flux is lowered. Accordingly, if the first lens G1 and the second lens G2 are not disposed with a distance therebetween, the back focus cannot be elongated well, thereby hindering the decrease in size. When f1/fa exceeds the upper limit of Conditional Expression (2), the negative power becomes too strong and the image-side curvature radius of the first lens G1 becomes too small, thereby deteriorating the workability. Furthermore, since the field curvature is in an excessive tilting state and the great negative distortion occurs, the resolution and the image quality are deteriorated.

Conditional Expression (3) is a condition for further efficiently diverging the light flux diverged by the first lens G1. In Conditional Expression (3), if the relation between the curvature radii r3 and r4 satisfies |r3|<|r4| and (r3+r4)/(r3−r4) falls below the lower limit of Conditional Expression (3) or if the relation between the curvature radii r3 and r4 satisfies |r3|>|r4| and (r3+r4)/(r3−r4) exceeds the upper limit of Conditional Expression (3), the divergence of the light flux is enhanced and is effective for elongating the back focus. However, since the great positive power is required for a subsequent concentration lens, a high-order aberration is likely to occur in the peripheral portion of the light flux and great distortion occurs. As a result, the resolution and the image quality would be deteriorated. Particularly, if the relation between the curvature radii r3 and r4 satisfies |r3|>|r4| and (r3+r4)/(r3−r4) exceeds the upper limit of Conditional Expression (3), the second lens 52 has such a shape to increase the divergence of the peripheral light flux. Accordingly, since the image surface is too curved, it is difficult to correct the field curvature while keeping other aberrations good. As a result, it is difficult to obtain excellent performance all over the entire image formation surface.

Here, Conditional Expression (3) may be modified to the following conditional expression.

$$-3.0<(r3+r4)/(r3-r4)<0.2 \tag{3A}$$

Conditional Expression (4) is a condition for properly controlling an angle of a main beam of a light flux incident onto the image formation surface at each image height. Since the imaging element 100 such as a CCD has a characteristic that ununiformity in quantity of light occurs depending on the angle of the light flux incident onto the image formation surface, it is important that the incidence angle of the light flux is kept within a proper angle range. When the aperture stop St is positioned to satisfy Conditional Expression (4), an exit pupil can be disposed apart from the image surface, thereby suppressing the incidence angle onto the image formation surface from being increased. Also, with this configuration, the shape of the fourth lens G4 has a great inclination at the peripheral portion, thereby preventing a high-order comma aberration from occurring. When the aperture stop St gets close to the image formation surface so that (d7+d8) exceeds the upper limit of Conditional Expression (4), the incidence angle onto the image formation surface increases and it is thus necessary to take a back focus longer than needed. Accordingly, the lateral chromatic aberration increases to deteriorate the resolution and the burden on the fourth lens G4 in aberration correction increases. As a result, it is not possible to satisfactorily correct the distortion.

Conditional Expression (5) is a condition for selection of a material of the third lens G3. Selecting a material satisfying Conditional Expression (5) is particularly effective to correct the lateral chromatic aberration. It is possible to correct the lateral chromatic aberration which has occurred due to the strong negative power of the first lens G1 and the second lens G2, by using a material having a great dispersion for the positive third lens G3.

Conditional Expression (6) is a condition for selection of a material of the first lens G1. Selecting a material satisfying conditional Expression (6) suppresses the longitudinal chromatic aberration. For the purpose of effective correction of the chromatic aberrations and relaxation in difficulty of workability of the lens, it is more preferable that the following conditional expression is satisfied. Here, Nd1 denotes a refractive index of the first lens G1 at the d-line.

$$vd1<40 \tag{6A}$$

$$1.6<Nd1 \tag{6B}$$

With this configuration, the chromatic aberrations can be corrected well. Therefore, high resolution can be obtained. Also, even if the first lens G1 has the proper power expressed by Conditional Expression (2), it is possible to prevent the workability from being made difficult due to the too small curvature radius of the image formation surface side.

As described above, in the imaging lens according to this embodiment, it is possible to provide a wide-angle lens system with high performance which has a wide viewing angle, a small size and small image distortion. In the imaging device according to this embodiment, since the imaging signals are output which correspond to an optical image formed by the imaging lens according to this embodiment with high performance, it is possible to obtain imaging signals with high resolution.

EXAMPLES

Next, specific numerical examples of the imaging lens according to this embodiment will be described. Hereinafter, the first to seventh numerical examples will be described.

FIGS. 8A and 8B show specific lens data corresponding to the configuration of the imaging lens shown in FIG. 1. Particularly, the basic lens data is shown in FIG. 8A and the aspherical surface data are shown in FIG. 8B. In the column of the surface number Si in the lens data of FIG. 8A, number of i-th (where i=1 to 11) surface is shown when a surface of the most-object-side element is counted as the first surface and the surface number increases in order toward the image side. The curvature radius ri denotes a curvature radius (mm) of the i-th surface from the object side so as to correspond to reference numeral ri shown in FIG. 1. The surface separation di denotes a separation (mm) between the i-th surface Si from the object and the (i+1)-th surface Si+1 on the optical axis. Reference numeral Ndj denotes a refractive index of the j-th (where j=1 to 5) optical element from the object side at the d-line (587.6 nm in wavelength). Reference numeral vdj denotes Abbe number of the j-th optical element from the object side at the d-line.

In the imaging lens according to Example 1, both surfaces S3 and S4 of the second lens C2 and both surfaces S8 and S9 of the fourth lens G4 are aspheric. In the basic lens data shown in FIG. 8A, numerical values of the curvature radii in the vicinity of the optical axis are shown as the curvature radii of these aspheric surfaces. In the numerical values shown as the aspheric data in FIG. 8B, sign "E" denotes that the numerical value subsequent thereto is an "exponent" having 10 as a base thereof and represents that the numerical value expressed as the exponential function having 10 as the base thereof is multiplied by the numerical value in front of "E." For example, "1.0E-02" represents "$1.0 \times 10^{-2}$."

Values of coefficients $B_n$ and K in an aspheric surface shape expression expressed by the following expression (A) are shown as the aspheric data. More specifically, Z denotes a length (mm) of a perpendicular line connecting a point on the aspheric surface located at a height Y from the optical axis Z1 to a tangential plane (plane perpendicular to the optical axis Z1) at a vertex of the aspheric surface. The imaging lens according to Example 1 is represented by the aspheric coefficients $B_n$ up to the tenth order.

$$Z=C \cdot Y^2/\{1+(1-K \cdot C^2 \cdot Y^2)^{1/2}\}+\Sigma B_n \cdot |Y|^n \tag{A}$$

where n denotes an integer equal to or greater than 2, Z denotes a depth (mm) of the aspheric surface, Y denotes a distance (height) (mm) from the optical axis to the lens surface, K denotes an eccentricity (secondary aspheric coefficient), C denotes a paraxial curvature=1/r (r: a paraxial curvature radius), and $B_n$ denotes the n-th aspheric coefficient.

Figure 2:
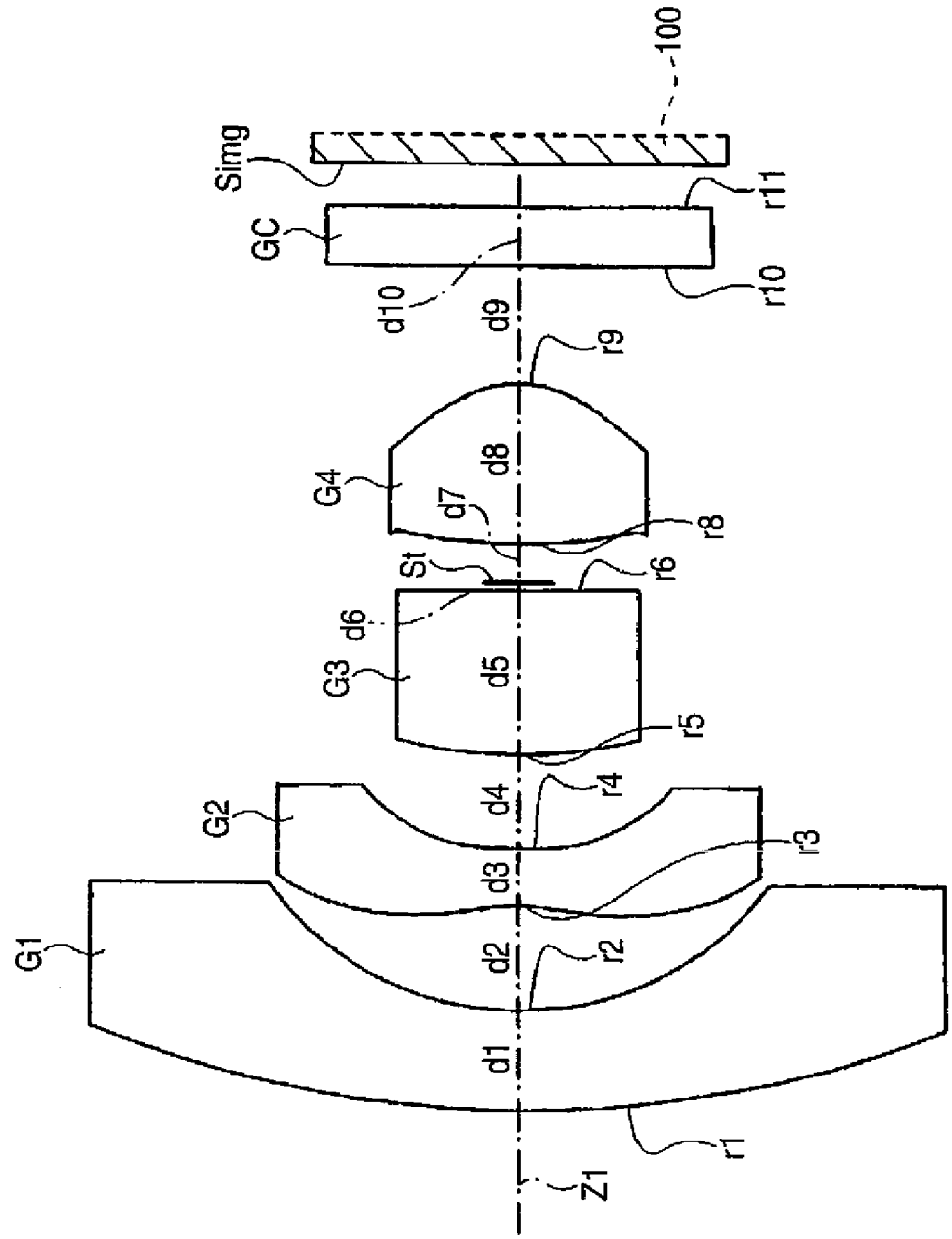
FIG. 2 is a diagram that illustrates a second configuration example of the imaging lens according to the embodiment of the invention and that shows a section view of lenses corresponding to Example 2.
Figure 3:
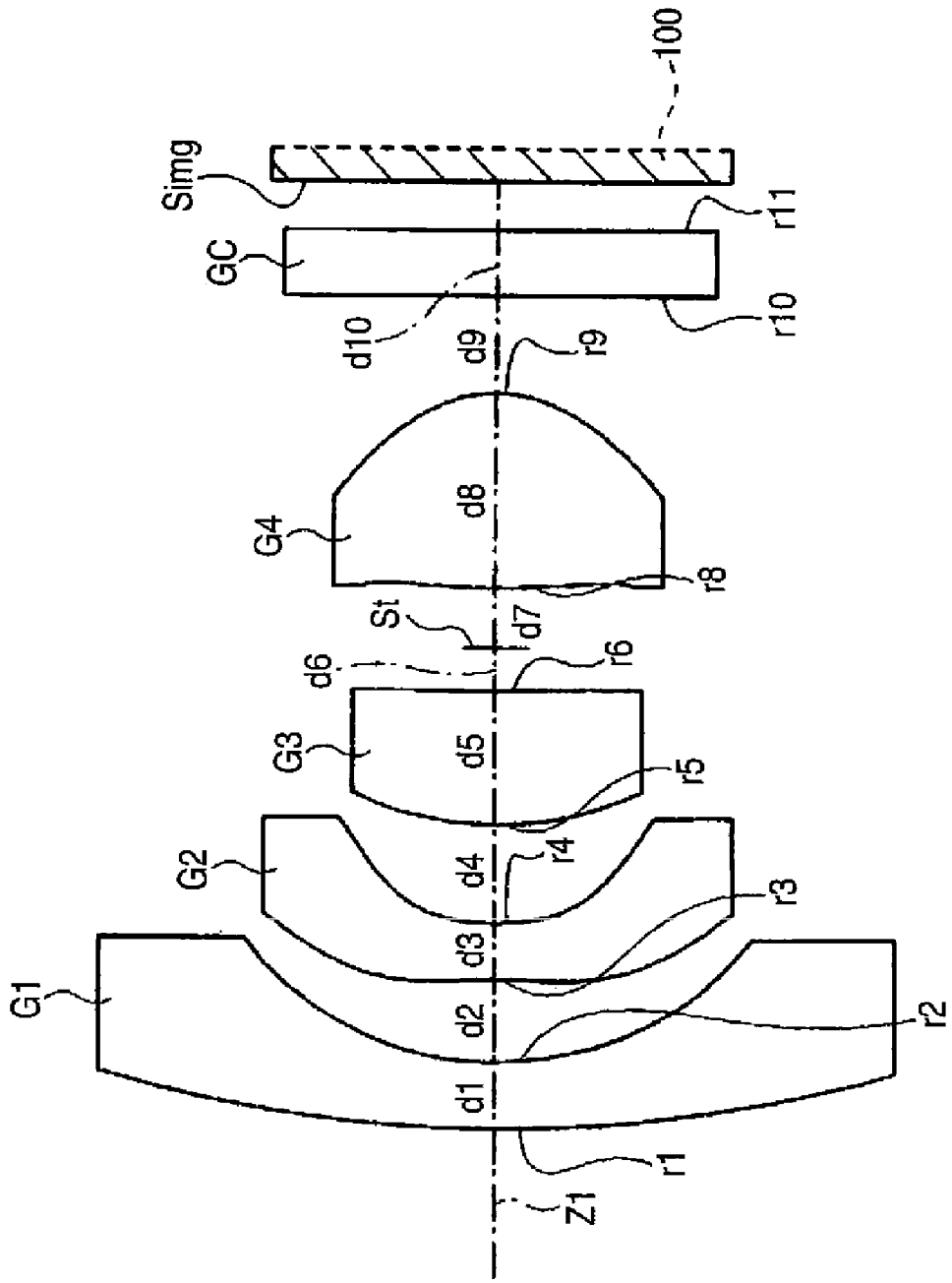
FIG. 3 is a diagram that illustrates a third configuration example of the imaging lens according to the embodiment of the invention and that shows a section view of lenses corresponding to Example 3.
Figure 4:
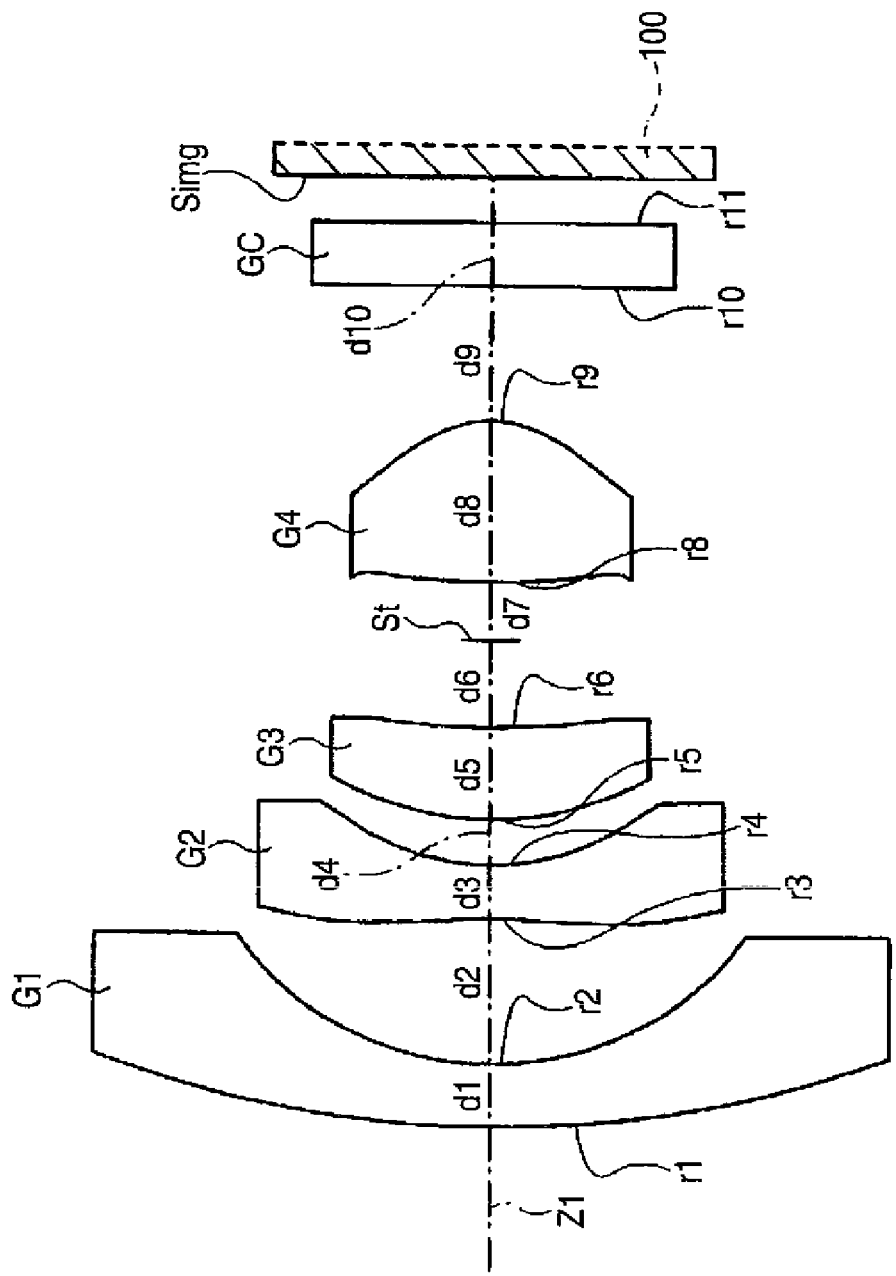
FIG. 4 is a diagram that illustrates a fourth configuration example of the imaging lens according to the embodiment of the invention and that shows a section view of lenses corresponding to Example 4.
Figure 5:
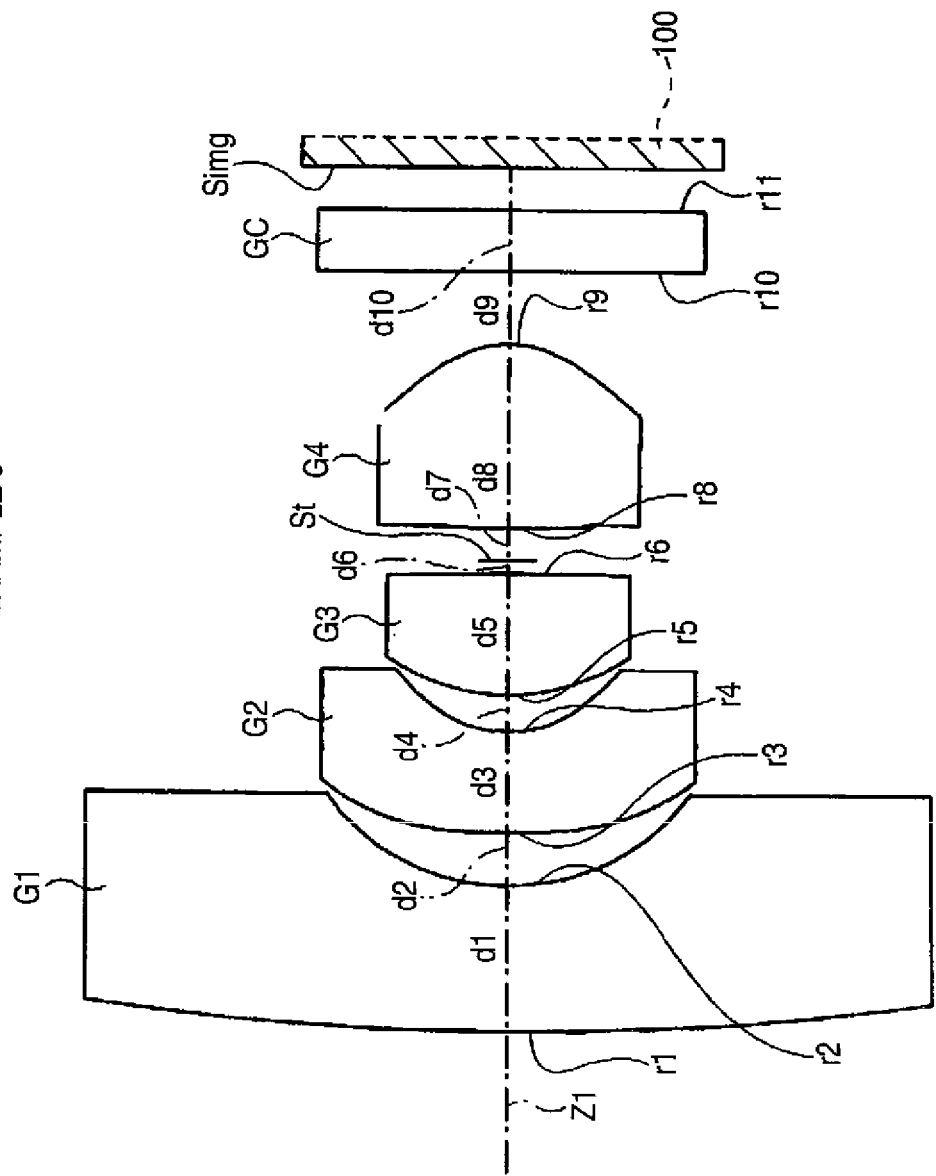
FIG. 5 is a diagram that illustrates a fifth configuration example of the imaging lens according to the embodiment of the invention and that shows a section view of lenses corresponding to Example 5.
Figure 6:
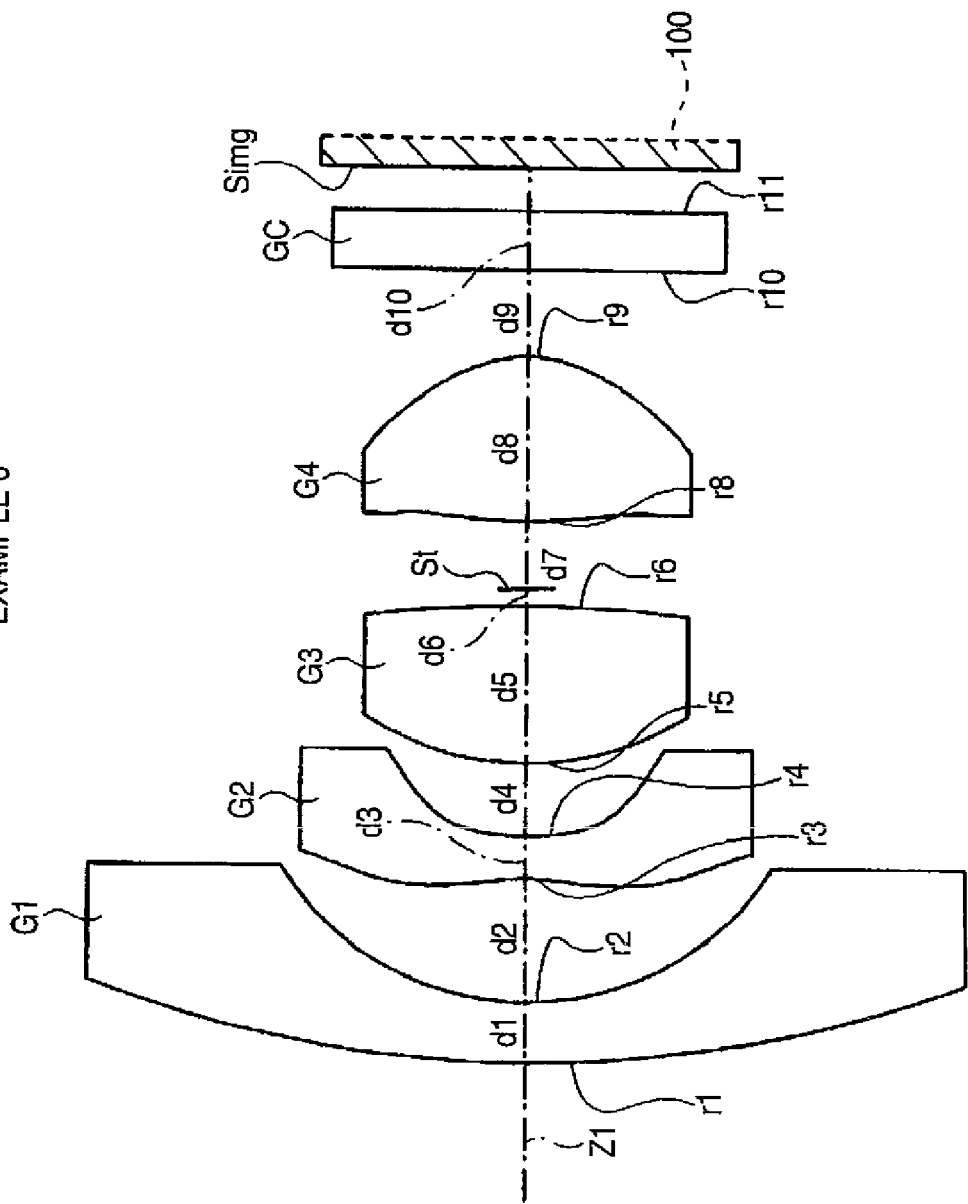
FIG. 6 is a diagram that illustrates a sixth configuration example of the imaging lens according to the embodiment of the invention and that shows a section view of lenses corresponding to Example 6.
Figure 7:
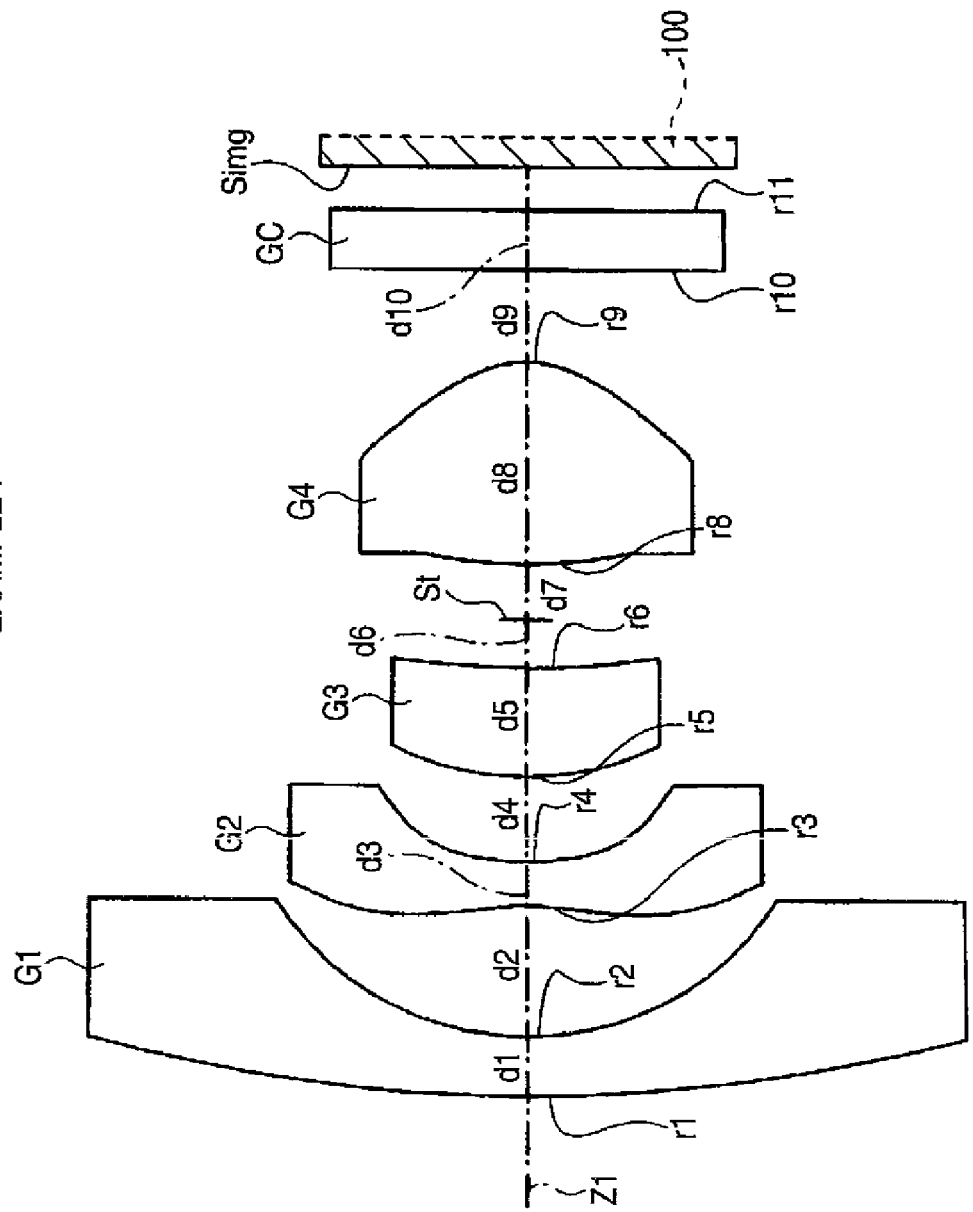
FIG. 7 is a diagram that illustrates a seventh configuration example of the imaging lens according to the embodiment of the invention and that shows a section view of lenses corresponding to Example 7.
Figure 16:
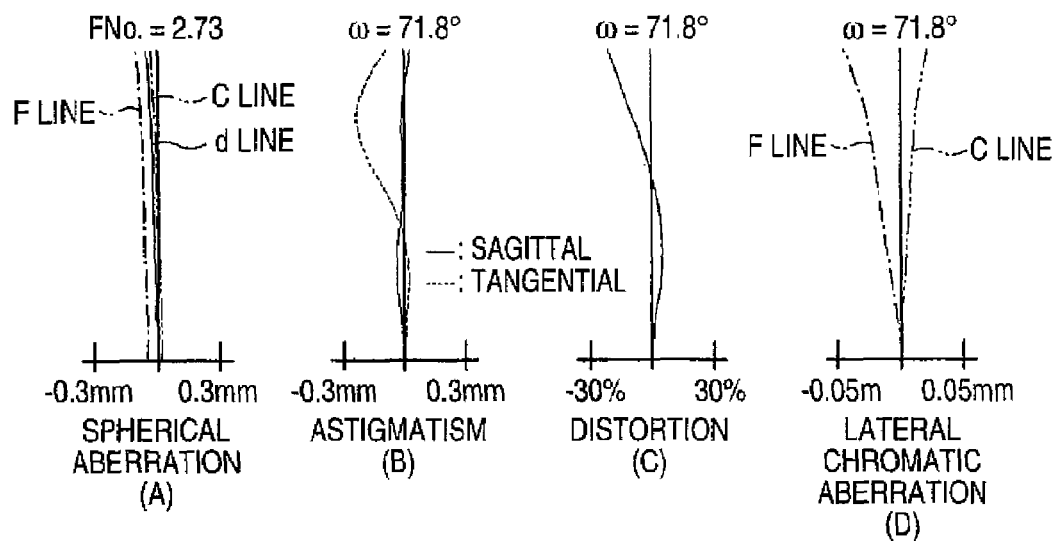
FIG. 16 is an aberration diagram illustrating various aberrations in the imaging lens according to Example 1 of the invention, where
Figure 17:
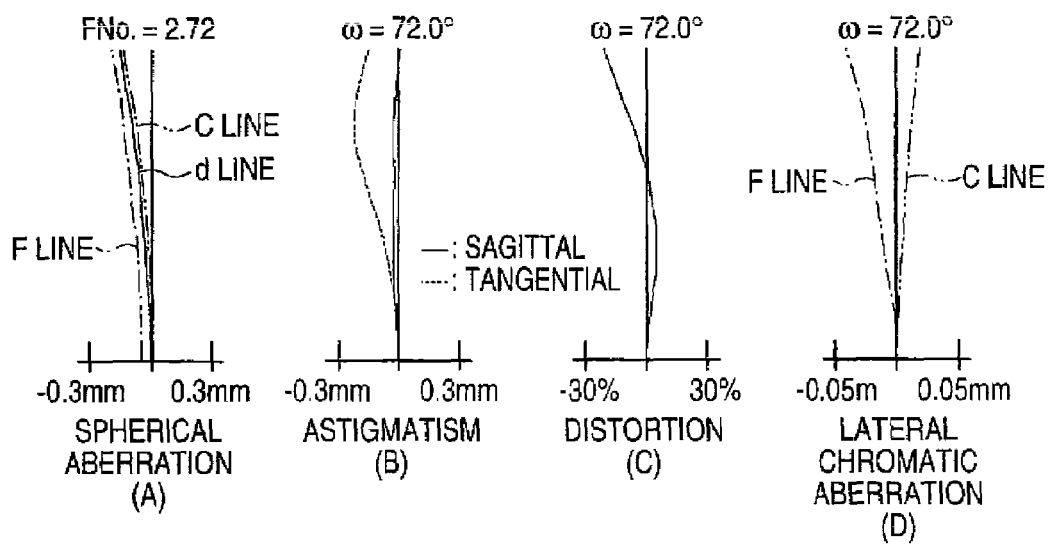
FIG. 17 is an aberration diagram illustrating various aberrations in the imaging lens according to Example 2 of the invention, where
Figure 20:
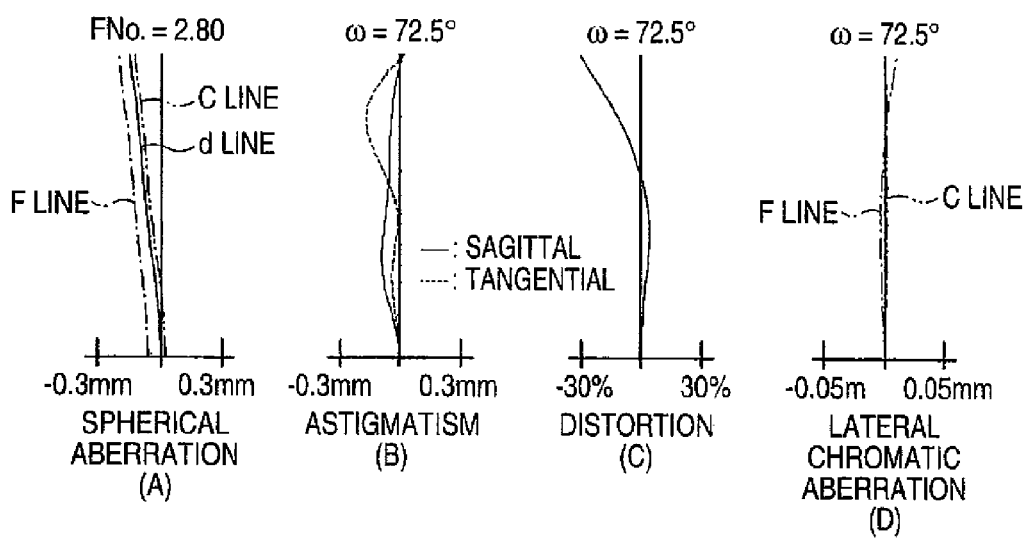
FIG. 20 is an aberration diagram illustrating various aberrations in the imaging lens according to Example 5 of the invention, where
Figure 21:
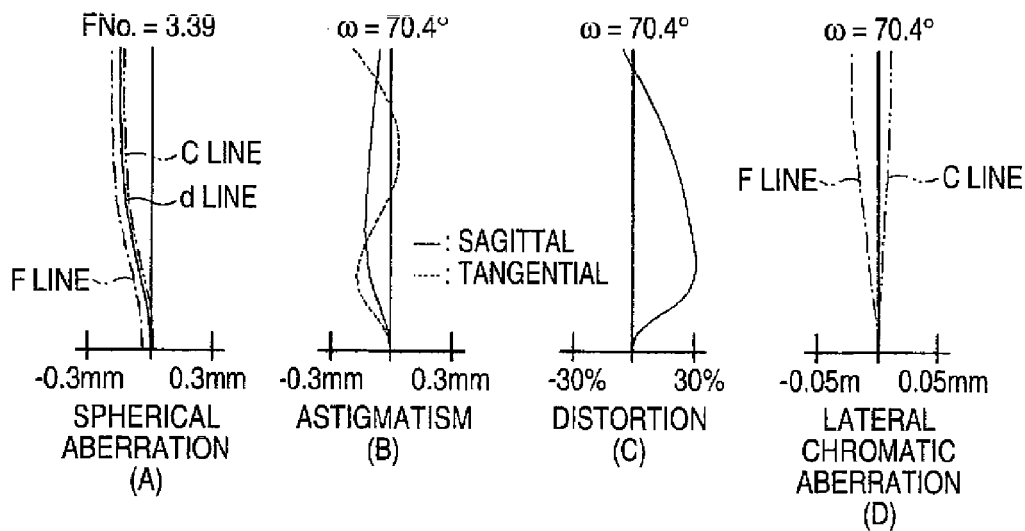
FIG. 21 is an aberration diagram illustrating various aberrations in the imaging lens according to Example 6 of the invention, where
Figure 22:
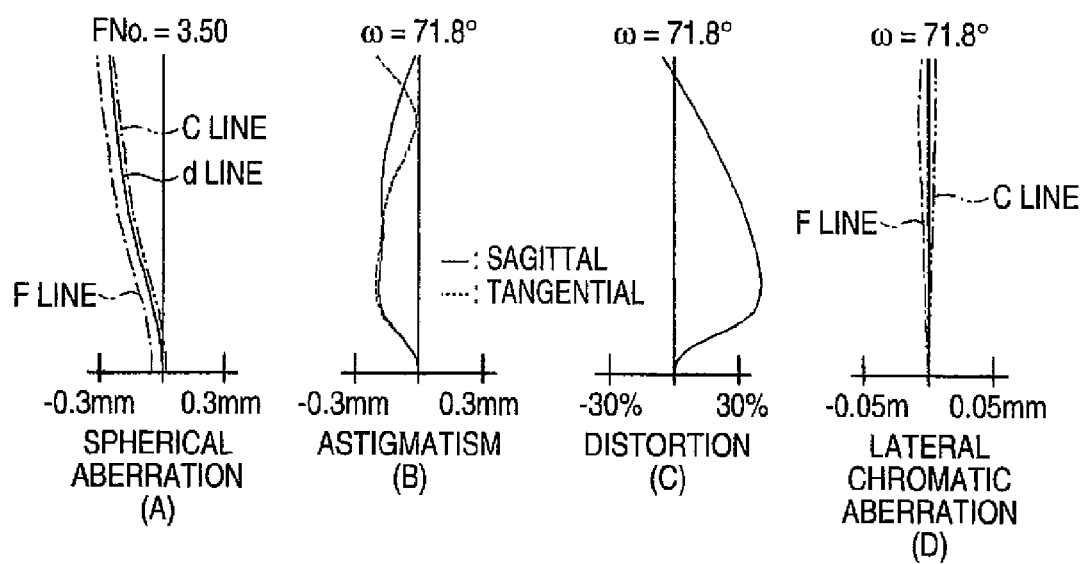
FIG. 22 is an aberration diagram illustrating various aberrations in the imaging lens according to Example 7 of the invention, where

Similarly to the imaging lens according to Example 1, specific lens data corresponding to the configuration of the imaging lens shown in FIG. 2 are shown as Example 2 in FIGS. 9A and 9B. Similarly, specific lens data corresponding to the configuration of the imaging lens shown in FIG. 3 are shown as Example 3 in FIGS. 10A and 10B. Similarly, specific lens data corresponding to the configuration of the imaging lens shown in FIG. 4 are shown as Example 4 in FIGS. 11A and 11B. Similarly, specific lens data corresponding to the configuration of the imaging lens shown in FIG. 5 are shown as Example 5 in FIGS. 12A and 12B. Similarly, specific lens data corresponding to the configuration of the imaging lens shown in FIG. 6 are shown as Example 6 in FIGS. 13A and 13B. Similarly, specific lens data corresponding to the configuration of the imaging lens shown in FIG. 7 are shown as Example 7 in FIGS. 14A and 14B. In the imaging lenses according to Examples 2 to 7, similarly to the imaging lens according to Example 1, both surfaces S3 and S4 of the second lens G2 and both surfaces S8 and S9 of the fourth lens G4 are aspheric.

FIG. 15 collectively shows values of the conditional expressions for the respective examples. As can be seen from FIG. 15, the values of the respective examples are within the numerical ranges of the respective conditional expressions.

FIGS. 16A to 16D show a spherical aberration, astigmatism, distortion and a lateral chromatic aberration of the imaging lens according to Example 1. In the aberration diagrams, aberrations are shown with the d-line used as a reference wavelength. In the diagrams of the spherical aberration and lateral chromatic aberration, aberrations at a F-line (486.1 nm in wavelength) and at a c-line (656.3 in wavelength) are also shown. In the diagram of the astigmatism, the solid line indicates the aberration in the sagittal direction and the dotted line indicates the aberration in the tangential direction. FNO denotes a value of F and ω denotes the semi viewing angle.

Similarly, various aberrations of the imaging lens according to Example 2 are shown in FIGS. 17A to 17D, various aberrations of the imaging lens according to Example 3 are shown in FIGS. 18A to 18D, various aberrations of the imaging lens according to Example 4 are shown in FIGS. 19A to 19D, various aberrations of the imaging lens according to Example 5 are shown in FIGS. 20A to 20D, various aberrations of the imaging lens according to Example 6 are shown in FIGS. 21A to 21D, and various aberrations of the imaging lens according to Example 7 are shown in FIGS. 22A to 22D. As can be seen by comparison of the performance attributes, Embodiments 2 and 5, having the lens data shown in FIGS. 9A and 9B, and FIGS. 12A and 12B, have desirable features that appear in FIGS. 17A to 17D, and FIGS. 20A to 20D, respectively, and accordingly it is preferable that the thickness of the first lens is equal to or larger than 1.665 mm, as shown in FIGS. 9A and 12A.

As can be seen from the numerical data and the aberration diagrams, according to the examples, the wide-angle lens system with high performance is embodied which has a wide viewing angle, a small size, and small image distortion.

The invention is not limited to the embodiment and the examples, but may be modified in various manners. For example, the curvature radii, the surface separations and the refractive indexes of the lens components are not limited to the above-mentioned values, but may have different values.

Although such examples are described above that the second lens G2 and the fourth lens G4 are aspheric lenses, the first lens G1 and the third lens G3 may be aspheric.

What is claimed is:

1. An imaging lens comprising, in order from an object side:
   a first lens that is a negative lens having a meniscus shape with a convex surface directed to the object side;
   a second lens that is a negative lens;
   a third lens that is a positive lens having a convex surface directed to the object side;
   an aperture stop; and
   a fourth lens that is a biconvex lens, wherein
   the following conditional expression is satisfied:

$$2.111 < f4/fa \leq 2.7 \tag{1}$$

where fa denotes a focal length of the whole lens system, and
      f4 denotes a focal length of the fourth lens; and wherein the following conditional expression is satisfied:

$$-3.0 < (r3+r4)/(r3-r4) < 0.2 \tag{3A}$$

where r3 denotes a curvature radius of an object-side surface of the second lens, and
      r4 denotes a curvature radius of an image-side surface of the second lens.

2. The imaging lens according to claim 1, wherein the following conditional expression is satisfied:

$$-10.0 < f1/fa < -2.5 \tag{2}$$

where fa denotes a focal length of the whole lens system,
      f1 denotes a focal length of the first lens.

3. The imaging lens according to claim 2, wherein the following conditional expression is satisfied:

$$-10.0 < f1/fa \leq -6.105. \tag{2}$$

4. The imaging lens according to claim 1, wherein an object-side surface of the second lens includes an aspheric surface that has a concave shape toward the object side in a vicinity of an optical axis and has a convex shape toward the object side in a peripheral portion.

5. The image lens according to claim 1, wherein the aperture stop is positioned to satisfy the following conditional expression:

$$d6/(d7+d8) < 0.5 \tag{4}$$

where d6 denotes a distance, on an optical axis, between the third lens and the aperture stop,
      d7 denotes a distance, on the optical axis, between the aperture stop and the fourth lens, and
      d8 denotes a center thickness of the fourth lens.

6. The imaging lens according to claim 1, wherein an Abbe number vd3 of the third lens at a d-line satisfies the following conditional expression:

$$vd3 < 30 \tag{5}$$

7. The imaging lens according to claim 1, wherein an Abbe number vd1 of the first lens at a d-line satisfies the following conditional expression:

$$vd1 > 34 \tag{6}$$

8. The imaging lens according to claim 1, wherein the first lens is made of a glass material.

9. The imaging lens according to claim 1, wherein a surface treatment for giving a water-repellent property is applied to an object-side surface of the first lens.

10. The imaging lens according to claim 1, wherein at least one lens of the second lens, the third lens, and the fourth lens is made of a resin material.

11. The imaging lens according to claim 10, wherein a surface treatment for giving a property of reflecting or absorbing UV light is applied to at least one of the lens surfaces that are closer to the object side than the object-side surface of the most-object-side resin lens.

12. An imaging device comprising:
    the imaging lens according to claim 1; and
    an imaging element that outputs imaging signals corresponding to an optical image formed by the imaging lens.

13. The imaging lens according to claim 1, wherein the thickness of the first lens is equal to or larger than 1.178 mm.

14. An imaging lens comprising, in order from an object side:
    a first lens that is a negative lens having a meniscus shape with a convex surface directed to the object side;
    a second lens that is a negative lens;
    a third lens that is a positive lens having a convex surface directed to the object side;
    an aperture stop; and
    a fourth lens that is a biconvex lens, wherein
    the following conditional expression is satisfied:

$$1.5 < f4/fa < 2.7, \tag{1}$$

where fa denotes a focal length of the whole lens system, and
       f4 denotes a focal length of the fourth lens, wherein the following conditional expression is satisfied:

$$-3.0 < (r3+r4)/(r3-r4) < 0.2 \tag{3A}$$

where r3 denotes a curvature radius of an object-side surface of the second lens, and
       r4 denotes a curvature radius of an image-side surface of the second lens, and
       wherein an Abbe number vd1 of the first lens at a d-line satisfies the following conditional expression:

$$34 < vd1 \leq 53.2. \tag{6}$$

15. The imaging lens according to claim 14, wherein an object-side surface of the second lens includes an aspheric surface that has a concave shape toward the object side in a vicinity of an optical axis and has a convex shape toward the object side in a peripheral portion.

16. The imaging lens according to claim 14, wherein the aperture stop is positioned to satisfy the following conditional expression:

$$d6/(d7+d8) < 0.5 \tag{4}$$

where d6 denotes a distance, on an optical axis, between the third lens and the aperture stop,
       d7 denotes a distance, on the optical axis, between the aperture stop and the fourth lens, and
       d8 denotes a center thickness of the fourth lens.

17. An imaging device comprising:
    the imaging lens according to claim 14; and
    an imaging element that outputs imaging signals corresponding to an optical image formed by the imaging lens.

18. An imaging device comprising:
    the imaging lens according to claim 14; and
    an imaging element that outputs imaging signals corresponding to an optical image formed by the imaging lens.

19. The imaging lens according to claim 14, wherein the thickness of the first lens is equal to or larger than 1.178 mm.

* * * * *